W. C. BELL.
Cultivating Plows.
No. 149,090. Patented March 31, 1874.
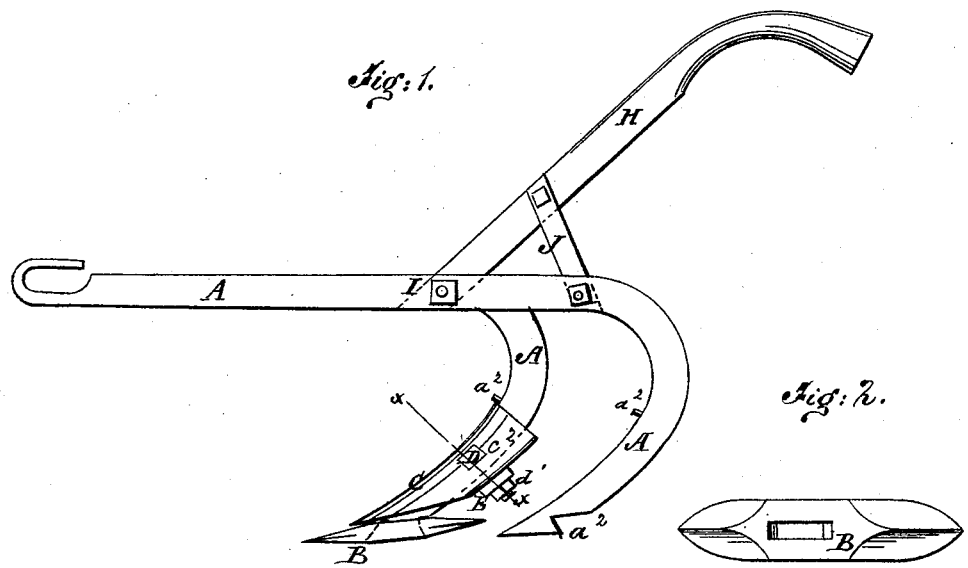
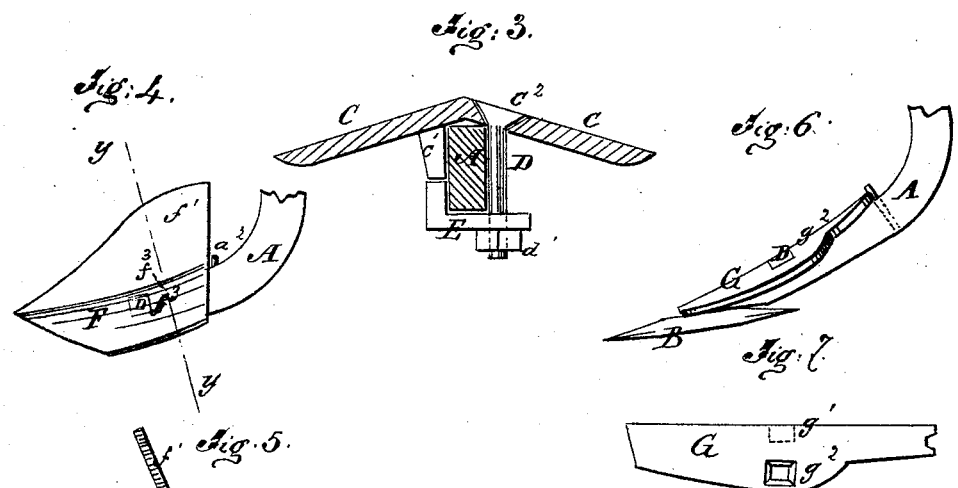
WITNESSES:
INVENTOR:
W. C. Bell
BY
ATTORNEYS.

UNITED STATES PATENT OFFICE.

WILLIAM C. BELL, OF ORANGE COURT-HOUSE, VIRGINIA.

IMPROVEMENT IN CULTIVATING-PLOWS.

Specification forming part of Letters Patent No. 149,090, dated March 31, 1874; application filed January 17, 1874.

*To all whom it may concern:*

Be it known that I, WILLIAM C. BELL, of Orange Court-House, in the county of Orange and State of Virginia, have invented a new and useful Improvement in Cultivating-Plow, of which the following is a specification:

Figure 1 is a side view of my improved plow, one of the points and shovels being removed. Fig. 2 is a detail view of one of the points. Fig. 3 is a detail cross-section, taken through the line $x\ x$, Fig. 1. Fig. 4 is a detail view of the clod-fender shovel. Fig. 5 is a detail cross-section of the same. Fig. 6 represents the point secured by a holder. Fig. 7 is a detail view of the holder.

Similar letters of reference indicate corresponding parts.

My invention has for its object to furnish an improved plow for cultivating tobacco, corn, and other crops planted in hills or rows, which shall be so constructed as to cut up and wholly destroy grass, weeds, briers, &c., which may be growing among the plants, and which will allow the parts subject to wear to be readily detached and replaced by new ones, or by others better adaped to the state of the plants to be cultivated. The invention consists in the construction and arrangement of parts whereby a horizontal cutting blade or shovel and a vertically-arranged shovel are secured to the standard, and yet adapted for ready detachment and reversal.

A are the beams or frame of the cultivator, which is made V-shaped, and have a hook formed upon the forward end or angle for the attachment of the draft. One of the beams A is made shorter than the other, and the rear parts of both beams are curved downward to serve as standards to receive the plows. In the rear side of the lower ends of the beams A is formed a notch, $a'$, to receive the points B, which are made double, or with a point upon each end, so that they can be reversed when worn. In the center of the points B is formed a short longitudinal slot, to receive the lower end of the beams or standards A. In putting on the points B, they are raised into a vertical position and are slipped over the ends of the standards A, and are slipped back to the notch $a^1$, when they can be turned down into a horizontal position, where they are held in place by the shovels C, which rest upon the forward edge of the standards A. Upon the under side of the shovels C is formed a lug, $c^1$, in such a position as to rest against the side of the standard A, and through said shovels is formed a hole, $c^2$, to receive the bolt D, in such a position that the said bolt may pass across the side of the standard A opposite the lug $c^1$. E is a washer, which is placed upon the bolt D upon the rear side of the standard A, and one end of which is bent at right angles, so as to rest against the side of the said standard, and upon the lugs $c^1$, and thus, when the nut $d'$ of the bolt D is screwed on, hold the shovel C securely in place. F is a shovel, which is made with a forward projecting flange or wing, $f^1$, to protect the small plants from clods and lumps thrown by the plow, and thus enable the plow to work closer to the plants than would be otherwise possible. The clod-fender shovel F has two lugs, $f^2$, formed upon its under side, one upon each side of the standard A, and with a hole, $f^3$, to receive the bolt D for securing it to the standard A. G is a bar, which is made with a lug, $g^1$, and a hole, $g^2$, to receive the bolt D. The bar G is designed to hold the point B in place when shovels are not used, and when the object is simply to loosen up the soil. H are the handles, which are secured to the beams A by a screw-rod, I, and its nuts, so that by adjusting the said nuts the beams A may be brought closer together or farther apart, as may be desired. The handles are connected by a round, in the usual way, and are supported at the proper elevation by braces J, the upper ends of which are secured to the handles H, and their lower ends are secured to the beams A. To the forward edge of the standards A is attached a pin, $a^2$, which enters a notch in the upper edge of the shovels C, clod-fender shovel F, and point-holder G, to give them additional steadiness.

Having thus described my invention, I claim as new and desire to secure by Letters Patent—

1. The combination, with the standard A, having toe-point and heel-notch, of the point B, having slot, as shown, and a shovel, C, secured to standard, as set forth.

2. The shovel C, having lug $c^1$, and the right-angled bar or washer E, and the bolt D, in combination with the standard A, as shown and described.

WILLIAM C. BELL.

Witnesses:
RICHARD CHAPMAN,
PHILIP H. FRY.